(12) United States Patent
Palmer

(10) Patent No.: US 11,699,257 B2
(45) Date of Patent: Jul. 11, 2023

(54) FACE DETECTION AND BLURRING METHODS AND SYSTEMS

(71) Applicant: Flyreel, Inc., Denver, CO (US)

(72) Inventor: Victor Palmer, College Station, TX (US)

(73) Assignee: Flyreel, Inc., Denver, CO (US)

( * ) Notice: Subject to any disclaimer, the term of this patent is extended or adjusted under 35 U.S.C. 154(b) by 60 days.

(21) Appl. No.: 17/403,104

(22) Filed: Aug. 16, 2021

(65) Prior Publication Data
US 2022/0292643 A1 Sep. 15, 2022

Related U.S. Application Data

(63) Continuation of application No. 17/200,568, filed on Mar. 12, 2021, now Pat. No. 11,094,042.

(51) Int. Cl.
*G06T 7/00* (2017.01)
*G06T 15/00* (2011.01)
(Continued)

(52) U.S. Cl.
CPC ............ *G06T 15/00* (2013.01); *G06F 18/214* (2023.01); *G06T 5/002* (2013.01); *G06T 7/248* (2017.01);
(Continued)

(58) Field of Classification Search
CPC ......... G06T 5/002; G06T 7/248; G06T 11/60; G06T 2207/20081; G06T 2207/20084;
(Continued)

(56) References Cited

U.S. PATENT DOCUMENTS 6,959,099 B2   10/2005   Gutta et al.
7,916,897 B2    3/2011   Corcoran et al.
(Continued)

FOREIGN PATENT DOCUMENTS

JP        5159381 B2    12/2012
WO     2018103244 A1     6/2018

OTHER PUBLICATIONS

Agrawal, et al., "Person De-Identification in Videos," IEEE Transactions on Circuits and Systems for Video Technology, vol. 21, No. 3, Mar. 2011, pp. 299-310.
(Continued)

*Primary Examiner* — Jose L Couso
(74) *Attorney, Agent, or Firm* — Troutman Pepper Hamilton Sanders LLP; James E. Schutz; Mark Lehi Jones

(57) ABSTRACT

Methods, systems, and devices for generating a training set and using the training set to train an artificial intelligence algorithm to detect and blur faces in images of an interior space are described. An example method for generating a training set includes selecting a first image depicting an interior of a room, selecting a second image depicting at least a face of a person, generating, based on a transparency parameter and a roughness parameter, a semi-transparent surface image, selecting an illumination parameter to configure a first illumination level for the first image and a second illumination level for the second image, and generating a first composite image of the training data set by combining the illumination parameter, the first image, the second image, and the semi-transparent surface image.

7 Claims, 13 Drawing Sheets

1150

1151
Receiving a plurality of images that captures a person traversing an interior of a room 1152
Processing, using a face detection algorithm, the plurality of images to identify an anchor image comprising a complete view of a face of the person and generating a bounding box for the face of the person 1153
Processing, using an optical region tracking algorithm, the plurality of images to identify a trajectory of the bounding box across the plurality of images 1154
Applying a blurring kernel over the bounding box across each of the plurality of images

(51) Int. Cl.
*G06T 5/00* (2006.01)
*G06T 11/60* (2006.01)
*G06T 7/246* (2017.01)
*G06V 40/16* (2022.01)
*G06F 18/214* (2023.01)
*G06V 10/764* (2022.01)
*G06V 10/44* (2022.01)

(52) U.S. Cl.
CPC ............ *G06T 11/60* (2013.01); *G06V 10/454* (2022.01); *G06V 10/764* (2022.01); *G06V 40/161* (2022.01); *G06T 2207/20081* (2013.01); *G06T 2207/20084* (2013.01); *G06T 2207/30201* (2013.01)

(58) Field of Classification Search
CPC .......... G06T 2207/30201; G06T 11/00; G06T 15/00; G06T 1/00; G06T 5/005; G06T 11/001; G06T 7/0004; G06T 7/20; G06T 7/215; G06T 7/70; G06T 7/251; G06T 2207/10016; G06T 2207/30196; G06T 2207/30232; G06T 2207/20092; G06T 2207/20012; G06T 2207/20016; G06T 3/4046; G06T 9/002; G06K 9/6256; G06K 9/627; G06K 9/00228; G06K 9/00369; G06K 9/00771; G06K 9/00342; G06K 9/00362; G06K 9/00677; G06K 9/00791; G06K 9/00711; G06K 9/00778; G06K 9/3233; G06K 9/4604; G06K 9/48; G06K 9/74; G06K 9/00221; G06K 9/00281; G06K 9/00604; G06K 9/00288; G06K 9/00261; G06K 9/00255; G06K 9/00248; G06K 9/00295; G06K 9/323241; G06K 9/4614; G06K 9/52; G06K 9/66; G06K 9/72; G06K 7/1482; G06V 40/161; G06V 10/454; G06V 10/764; G06V 40/40; G06V 40/142; G06V 40/165; G06V 40/172; G06V 10/42; G06V 20/30; G06V 10/70; G06V 10/7553; G06V 10/7715; G06V 10/778; G06V 10/82; G06V 20/36; G06V 20/39; G06V 20/44; G06V 20/52; G06V 20/53; G06V 20/58; G06V 30/18057; G06F 21/6245; G06F 21/6254; G06F 21/6209; H04L 2209/04; H04L 9/0894; H04N 5/23219; H04N 5/23229; H04N 5/913; H04N 2005/91321; H04N 2005/91357; G06N 3/02; G06N 3/08–088; G06N 3/0445; G06N 3/0454; G06N 7/00; G06N 20/00
See application file for complete search history.

(56) References Cited

U.S. PATENT DOCUMENTS

| | | |
|---|---|---|
| 8,305,448 B2 | 11/2012 | Yoda |
| 8,345,921 B1 | 1/2013 | Frome et al. |
| 9,426,387 B2 | 8/2016 | Jung et al. |
| 9,478,033 B1* | 10/2016 | Safreed .................... G06T 7/251 |
| 9,571,785 B2 | 2/2017 | Farrell et al. |
| 10,169,597 B2 | 1/2019 | Ghafourifar et al. |
| 10,282,852 B1* | 5/2019 | Buibas .................... G06T 7/246 |
| 10,580,272 B1 | 3/2020 | Edwards et al. |
| 11,004,212 B1* | 5/2021 | Liu .......................... G06T 7/248 |
| 11,483,484 B2* | 10/2022 | Hoch ................. H04N 5/23229 |
| 2003/0108240 A1 | 6/2003 | Gutta et al. |
| 2007/0188795 A1 | 8/2007 | Chishima et al. |
| 2008/0267403 A1 | 10/2008 | Boult |
| 2009/0052739 A1* | 2/2009 | Takahashi ............ G06V 40/103 382/103 |
| 2009/0262987 A1 | 10/2009 | Ioffe et al. |
| 2013/0162817 A1 | 6/2013 | Bernal |
| 2014/0029804 A1 | 1/2014 | Kawaguchi |
| 2015/0161467 A1 | 6/2015 | Honda |
| 2016/0155465 A1 | 6/2016 | Park et al. |
| 2016/0307597 A1 | 10/2016 | Koide et al. |
| 2016/0307600 A1 | 10/2016 | Koide et al. |
| 2016/0379074 A1 | 12/2016 | Nielsen et al. |
| 2017/0046563 A1 | 2/2017 | Kim et al. |
| 2018/0012460 A1* | 1/2018 | Heitz, III ......... G08B 13/19682 |
| 2018/0012462 A1* | 1/2018 | Heitz, III ............... G06V 40/20 |
| 2018/0012463 A1* | 1/2018 | Chaudhry .............. G06V 20/49 |
| 2018/0061010 A1 | 3/2018 | Akselrod et al. |
| 2018/0137892 A1 | 5/2018 | Ding et al. |
| 2018/0189505 A1* | 7/2018 | Ghafourifar ........ G06F 21/6209 |
| 2018/0314850 A1 | 11/2018 | Li et al. |
| 2019/0130630 A1 | 5/2019 | Ackerson et al. |
| 2019/0138738 A1 | 5/2019 | Ricknäs et al. |
| 2019/0205694 A1* | 7/2019 | Wang .................... G06V 40/165 |
| 2019/0244030 A1 | 8/2019 | Yoshinaga |
| 2019/0378283 A1* | 12/2019 | Boult ........................ G06T 5/50 |
| 2020/0143838 A1* | 5/2020 | Peleg ..................... G11B 27/34 |
| 2020/0388030 A1 | 12/2020 | Steelberg et al. |
| 2021/0035342 A1* | 2/2021 | Glaser ..................... G06T 11/60 |
| 2021/0059565 A1* | 3/2021 | Morris .................. A61B 5/4088 |
| 2021/0365707 A1* | 11/2021 | Mao ........................ G06K 9/627 |
| 2022/0092792 A1* | 3/2022 | Chakraborty .......... G06N 20/00 |
| 2022/0156500 A1* | 5/2022 | Yoon ......................... G06N 3/08 |
| 2022/0366570 A1* | 11/2022 | Takahashi ............... G06T 7/215 |

OTHER PUBLICATIONS

Al-Mukhtar, F., "Tracking and Blurring the Face in a Video File," Special Issue: 1st Scientific International Conference, College of Science, Al-Nahrain University, Nov. 21-22, 2017, Part I, pp. 202-207.

* cited by examiner

1100

1101
Selecting a first image depicting an interior of a room

1102
Selecting a second image depicting at least a face of a person

1103
Generating, based on a transparency parameter and a roughness parameter, a semi-transparent surface image

1104
Selecting an illumination parameter to configure a first illumination level for the first image and a second illumination level for the second image

1105
Generating a first composite image of the training data set by combining the illumination parameter, the first image, the second image, and the semi-transparent surface image

Receiving a plurality of images that captures a person traversing an interior of a room

1152

Processing, using a face detection algorithm, the plurality of images to identify an anchor image comprising a complete view of a face of the person and generating a bounding box for the face of the person

1153

Processing, using an optical region tracking algorithm, the plurality of images to identify a trajectory of the bounding box across the plurality of images

1154

Applying a blurring kernel over the bounding box across each of the plurality of images

FIG. 11B

FACE DETECTION AND BLURRING METHODS AND SYSTEMS

CROSS REFERENCE TO RELATED APPLICATIONS

This application is a continuation of U.S. patent application Ser. No. 17/200,568, filed Mar. 12, 2021, which is incorporated herein by reference in its entirety.

TECHNICAL FIELD

This document generally relates to image and video processing, and more particularly to face detection and blurring.

BACKGROUND

Property inspections have historically required a trained professional to physically travel to a property to conduct a comprehensive property assessment, often in connection with a filing of an insurance claim, underwriting claims, or the sale of that property. In these scenarios, examining a property includes a non-invasive examination that is documented using notes and photos of the property. Typically, any photos taken that include any persons have limited value due to existing privacy laws and concerns. Ensuring that no people are present while the photos are being taken has proven inefficient, and in some scenarios, has resulted in no property inspection being performed or property not being underwritten, which exposes parties to an unnecessary level of risk.

BRIEF DESCRIPTION OF THE DRAWINGS

FIGS. 11A and 11B illustrate flow diagrams of methods for generating a training data set and face detection and blurring, respectively.

Figure 1:
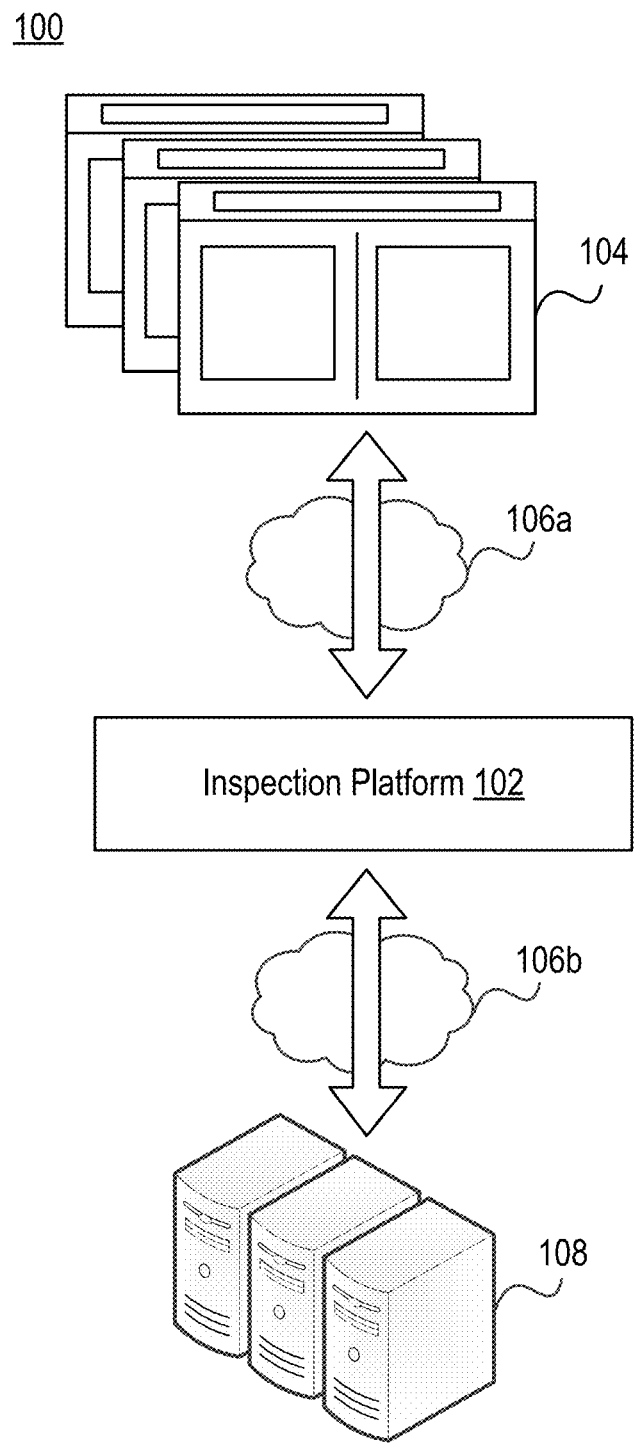
FIG. 1 illustrates an example network environment that includes an inspection platform.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Methods, systems, and devices for detecting and blurring faces for various applications, e.g., underwriting claims, property inspections, etc., are described. In an example, the computer programs described herein are configured to generate a training data set that is specifically designed to train an artificial intelligence (e.g., neural network or machine learning) algorithm to effectively operate in interior spaces which include reflective surfaces (e.g., mirrors, windows, translucent partitions or doors, etc.). In another example, the described computer programs can track one or more persons as they traverse through an interior space in a video and blur their face through the entire video. The described embodiments enable property inspections and underwriting activities, for example, to be conducted irrespective of the presence of current tenants or occupants with no privacy concerns, thereby improving their efficacy.

Embodiments may be described in the context of executable instructions for the purpose of illustration. However, those skilled in the art will recognize that aspects of the technology could be implemented via hardware, firmware, or software. As an example, a computer program that is representative of a software-implemented inspection platform (or simply "inspection platform") designed to facilitate face detection and blurring may be executed by the processor of a computing device. This computer program may interface, directly or indirectly, with hardware, firmware, or other software implemented on the computing device.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of the Inspection Platform

FIG. 1 illustrates an example network environment 100 that includes an inspection platform 102. Individuals (also referred to as "users") can interface with the inspection platform 102 via interfaces 104. For example, a user may be able to access an interface through which information regarding an interior space can be input. As another example, a user may be able to access an interface through which feedback is provided as digital images of an interior space are generated. In an example, these digital images may include one or more persons with their faces blurred out. These interfaces 104 may also permit users to view 2D and 3D representations of interior spaces, as well as manage preferences. The term "user," as used herein, may refer to a homeowner, business owner, assessor insurance adjuster (also referred to as a "claims adjuster"), or another individual with an interest in the dimensions of an interior space.

As shown in FIG. 1, the inspection platform 102 may reside in a network environment 100. Thus, the computing device on which the inspection platform 102 is implemented may be connected to one or more networks 106a-b. These networks 106a-b may be personal area networks (Pans), local area networks (LANs), wide area networks (WANs), metropolitan area networks (MANs), cellular networks, or the Internet. Additionally, or alternatively, the inspection platform 102 can be communicatively coupled to one or more computing devices over a short-range wireless connectivity technology, such as Bluetooth®, Near Field Communication (NFC), Wi-Fi® Direct (also referred to as "Wi-Fi P2P"), and the like.

The interfaces 104 may be accessible via a web browser, desktop application, mobile application, or over-the-top (OTT) application. For example, in order to complete the guided measurement procedure further described below, a user may access an interface that is generated by a mobile application executing on a mobile phone. This interface may also be accessible via the web browser executing on the mobile phone. Accordingly, the interfaces 104 may be viewed on a mobile phone, a tablet computer, a wearable electronic device (e.g., a watch or fitness accessory), or a virtual or augmented reality system (e.g., a head-mounted display).

In some embodiments, at least some components of the inspection platform 102 are hosted locally. That is, part of the inspection platform 102 may reside on the computing device that is used to access the interfaces 104. For example, the inspection platform 102 may be embodied as a mobile application that is executable by a mobile phone. Note, however, that the mobile application may be communicatively connected to a server system 108 on which other components of the inspection platform 102 are hosted.

In other embodiments, the inspection platform 102 is executed entirely by a cloud computing service operated by, for example, Amazon Web Services® (AWS), Google Cloud Platform™, or Microsoft Azure®. In such embodiments, the inspection platform 102 may reside on a server system 108 that is comprised of one or more computer servers. These computer server(s) can include different types of data (e.g., spatial coordinates, dimensions, digital images), algorithms for processing the data, property information (e.g., address, construction date, construction material, insurance provider), and other assets. Those skilled in the art will recognize that this information could also be distributed amongst the server system 108 and one or more computing devices. For example, some data that is generated by the computing device on which the inspection platform 102 resides may be stored on, and processed by, that computing device for security or privacy purposes.

Overview of Face Detection and Blurring

Figure 2:
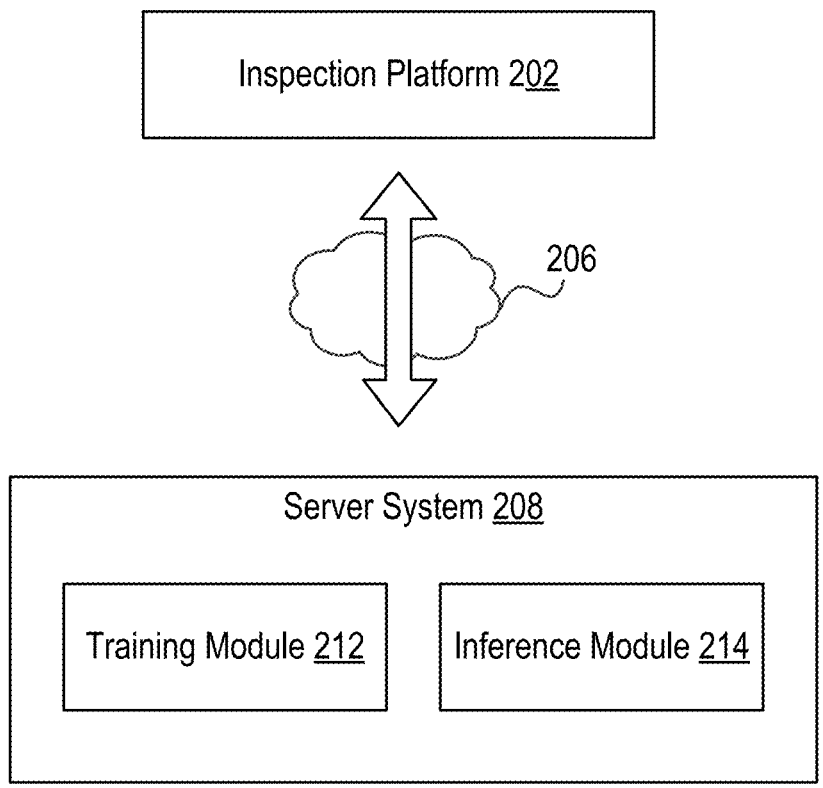
FIG. 2 illustrates an example server system that includes components to an artificial intelligence algorithm.

FIG. 2 illustrates another example of a network environment 200 that includes a server system 208 and inspection system 202. In some embodiments, the server system 208 and inspection system 202 may include functionality and support operations similar to server system 108 and inspection system 102 shown in FIG. 1, respectively, and described above. At least some details may not be separately described in this section.

In some embodiments, the server system 208 can be configured to implement an artificial intelligence algorithm, e.g., a neural network or a machine learning algorithm. As shown in FIG. 2, the server system includes a training module 212 and an inference module 214 of a neural network that is used for detecting faces. The training module 212 is configured to receive known data, e.g., data sets of images and video frames with faces identified, that is used to train the connections of the neural network to recognize faces. The trained neural network is used by the inference module 214 to recognize faces in new images and videos received by the server system 208 from the inspection system 202 via the network 206.

In the embodiments described herein, a neural network is used as an example to describe the functionality of certain aspects of disclosed technology. However, it will be appreciated that the neural network is representative of a more generic artificial intelligence algorithm or framework. In an example, the neural network may be replaced with a supervised learning, unsupervised learning, or reinforcement learning algorithm, or another machine learning algorithm. In an example, the neural network may be implemented as a multi-layer perceptron, a convolutional neural network (CNN), a recurrent neural network (RNN), a long short-term memory (LSTM) architecture, or the like.

As described in the context of the server system 208 in FIG. 2, any algorithm includes a training module, which is configured to receive known data and train the network, and an inference module that can then process new data.

Example Embodiments for Generating a Training Data Set

As part of a digital property inspection and underwriting framework, embodiments of disclosed technology are configured to detect faces in interior or exterior spaces, which may include reflective surfaces. The present document uses the term reflective surface to cover the specular (or regular) reflection of light, wherein incident rays of light are reflected (to some degree) from a surface, thereby creating an image in the surface. For example, mirrors in interior rooms and mirrored building surfaces in external environments result in relatively sharp reflected images, whereas windows (e.g., an interior window of a house or a car window in an external environment) that are transparent (or semi-transparent) also result in reflections while allowing objects to be observed through the window. Herein, terms such as partially transparent surfaces or semi-transparent surfaces are used to denote types of reflective surfaces. Faces need to be blurred both when directly visible and, for example, when reflected in reflective surfaces in interior rooms and external environments.

Figure 3:
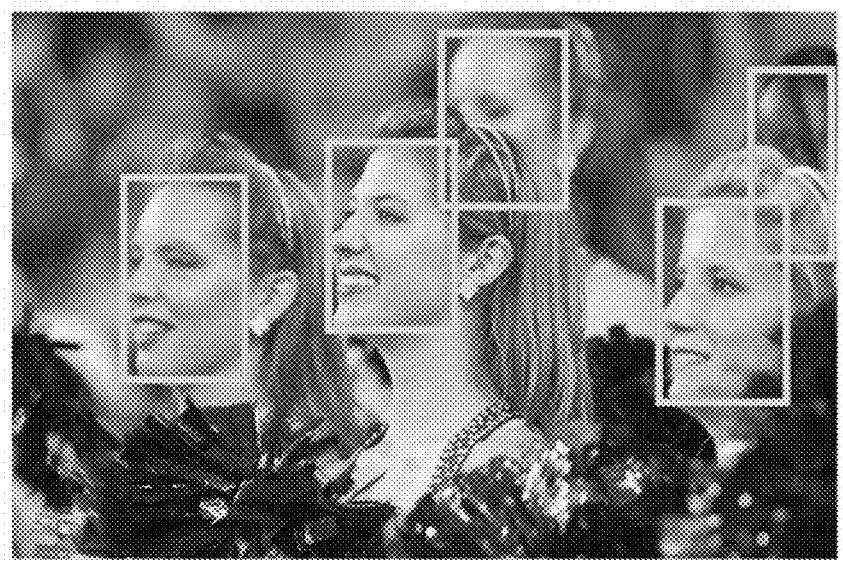
FIG. 3 illustrates an example of bounding boxes used in face detection.

Existing datasets for training neural networks to recognize faces, e.g., the WIDER FACE, FFHQ (Flickr-Faces_HQ) and LFW (Labeled Faces in the Wild) databases, typically include directly visible faces, an example of which is illustrated in FIG. 3. As shown in FIG. 3, faces in an image are detected by drawing a bounding box around the face. These datasets typically include images where there is no optical interface between the camera and the face, and therefore have limited utility for training a neural network that is configured to detect faces that are reflected off a possibly semi-transparent surface.

Figure 4:
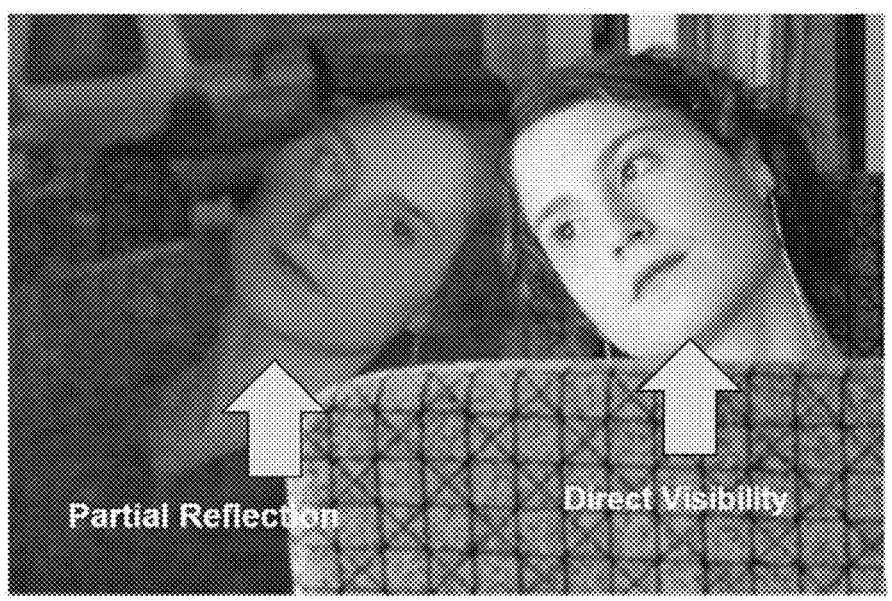
FIG. 4 illustrates an example of direct visibility and a partial reflection.

Training a neural network using only direct-visibility faces, and then using it to recognize faces reflected off of partially transparent surfaces results in poor performance, which is expected because the training data images and the inference images are very dissimilar. Detection performance will improve if the training data includes faces that are reflected off of semi-transparent surfaces. An example of this is shown in FIG. 4, which includes a directly visible face and a partial reflection of the face. Thus, detection performance can be improved by capturing thousands of images of faces reflected off of partially transparent surfaces, but the cost associated with this alternative is prohibitive.

Embodiments of the disclosed technology include generating a training set that enables training a neural network to accurately detect faces reflected off of semi-transparent surfaces. An example method includes transforming pictures of directly visible faces to faces reflected off of a partially transparent surface.

Figure 5:
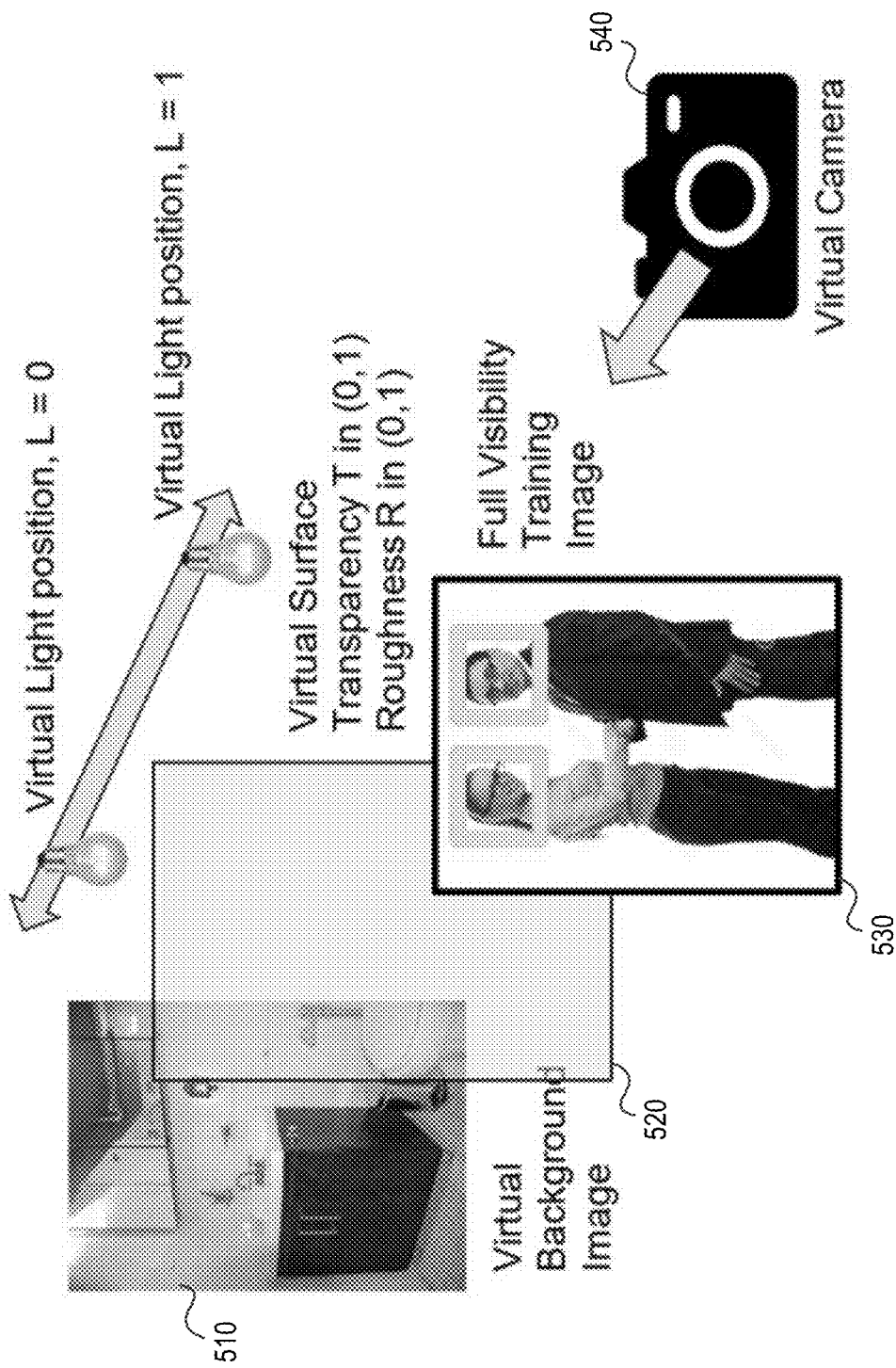
FIG. 5 illustrates the methodology of generating a training data set.
Figure 6B:
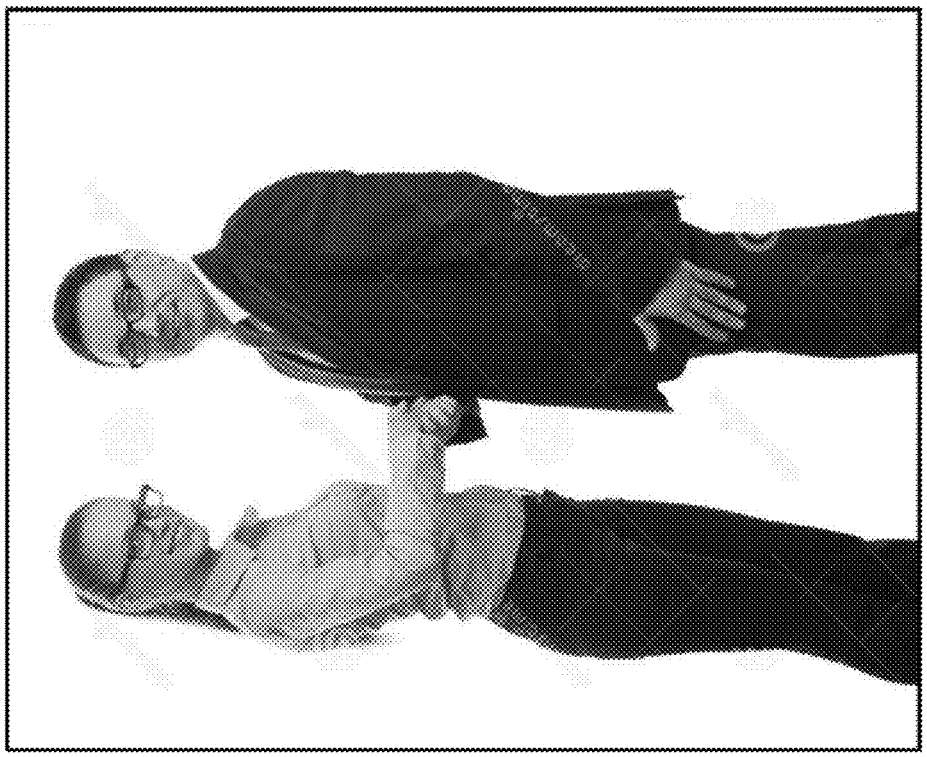
FIGS. 6A-6B illustrate example foreground and background images.
Figure 6A:

FIG. 5 illustrates an example methodology of generating a training data set. As shown therein, the training set is generated using a background image 510 (corresponding to FIG. 6A), a virtual surface 520, a full-visibility image 530 (corresponding to FIG. 6B), and three parameters with span ranges that are iterated over to generate images with varying transparency.

In some embodiments, the background image 510 is selected from publicly available scenes of interior rooms, e.g., bathrooms, living rooms, etc., and the full-visibility image 530 is selected from publicly available face datasets, e.g., the WIDER FACE database referenced earlier.

As shown in FIG. 5, a virtual semi-transparent surface 520 is modeled in between the background image 510 and the full-visibility image 530. The virtual semi-transparent surface 520 is configured using two parameters: (i) a transparency parameter (denoted T) that controls how much of the background image 510 is transmitted through the surface of the virtual semi-transparent surface 520, and (ii) a roughness parameter (denoted R) that controls the amount of surface imperfections of the virtual semi-transparent surface 520. In an example, the transparency and roughness parameters are real numbers that vary between 0 and 1. In an example, a higher value of the roughness parameter results in blurring of the final image, such as would occur on textured glass.

The third parameter is a position of a virtual light (denoted L) that can be positioned between the background image 510 and the full-visibility image 530, and which illuminates one or both images to varying degrees. In an example, the position parameter (L) is a real number that varies between 0 and 1. Values of L=0 and L=1 correspond to only the background image 510 and only the full-visibility image 530 being illuminated, respectively. A virtual camera 540 is then used to generate a composite image for values of T, R, and L.

In some embodiments, the mixing of the background image 510 and the full-visibility image 530 to generate the composite image is determined by first computing:

Full-visibility image component, $M1=L\times(1-T)$, and

Background image component, $M2=(1-L)\times T$.

The virtual camera pixel (denoted V), i.e., the output pixel, is computed using a corresponding pixel from the background image (denoted B) and a corresponding pixel from the full-visibility image (denoted F) as:

$$V=(M1\times B+M2\times F)/(M1+M2).$$

The composite image is then generated from the output image by applying a blurring kernel (denoted K) configured using the surface roughness parameter (R), as $K=R\times 5$. In an example, the blurring kernel is a Gaussian blurring kernel. The set of training data images is generated by sampling the three parameters (T, L and R) over their respective ranges to transform the full-visibility images and background images into simulated partial-transparency reflection images that can be used to train the neural network.

In some embodiments, the virtual camera can be rotated along the camera's optical axis by, for example, ±15 degrees when generating the training data set. That is, the set of training data images may have been captured in a limited set of conditions, but the target application may exist in a variety of conditions, and thus, applying virtual camera rotation is one example of modified or augmented data that can be used to improve inference performance. Other examples of generating augmented data include changing the scale, brightness, orientation, etc.

Figure 6D:
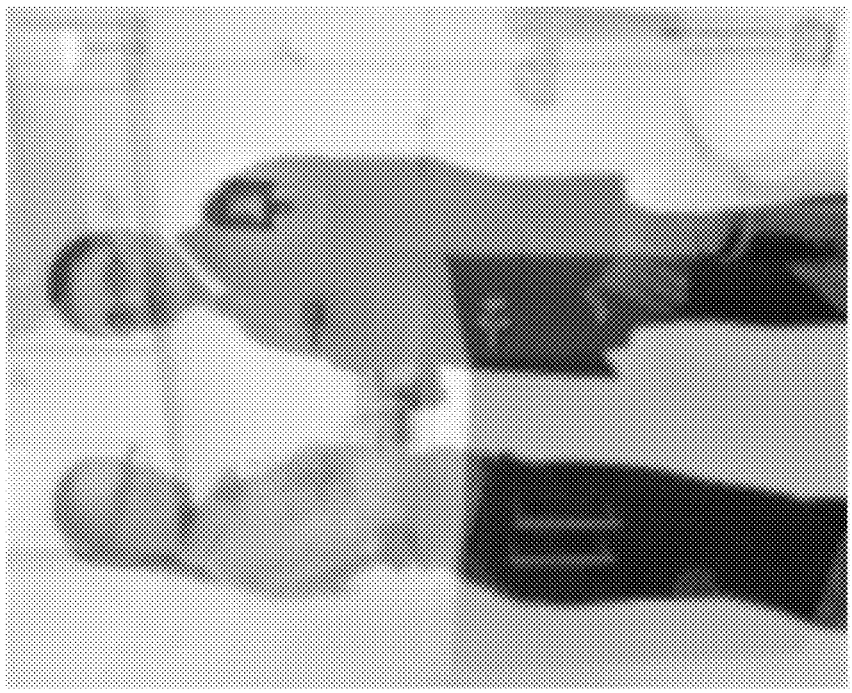
FIGS. 6C-6D illustrate example composite training data set images.
Figure 6C:
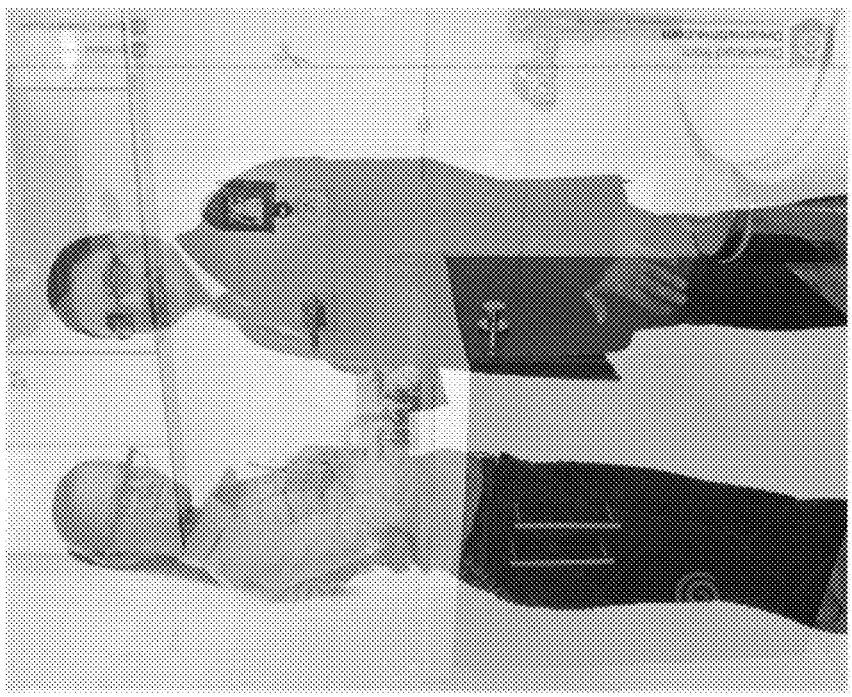

In an example, FIG. 6C shows a composite image that is generated using parameter values (T=0.5, L=0.5, R=0), which corresponds to 50% transparency, a virtual light in between the background and full-visibility images, and no roughness applied to the output image.

In another example, FIG. 6D shows a composite image that is generated using parameter values (T=0.5, L=0.5, R=0.5), which corresponds to 50% transparency, a virtual light in between the background and full-visibility images, and 50% roughness applied to the output image.

In some embodiments, a common range for the three parameters can be set to [0,1], and the composite images of the training data set are generated by evenly sampling the range of each parameter while keeping the values of the other parameters constant. For example, a single background image and a single full-visibility image can be used with T=0.0, 0.1, 0.2, . . . , 1.0, L=0, and R=0, to generate a first set of composite images, L=0 and R=0.1 to generate a second set of composite images, and so on. To ensure that the size of the training data remains manageable, certain values of the parameters may be skipped. The size of the training data set required to achieve a certain detection performance can be empirically determined, and the parameter ranges determined accordingly.

The composite images generated using the method described above are annotated to identify the faces, and then used to train the neural network. In an alternative, the full-visibility images are annotated to identify the faces prior to their transformation using the method described above. In an example, the training module 212 in FIG. 2 can be used to implement the training algorithm.

In some embodiments, the neural network is trained on the partial-transparency reflection images in a manner similar to that used to train a neural network for standard full-visibility images.

The composite partial-transparency reflection images are generated to train the neural network to achieve a required level of detection performance, and can be used for both supervised and unsupervised training algorithms for neural networks. Different training algorithms, e.g., back propagation, multi-dimensional optimization, etc. can be used in conjunction with the generated training data set.

Example Embodiments for Face Detection and Blurring

A neural network that is trained using a training data set generated using the methods described above can be used to detect faces in property inspection video, which can then be blurred. However, neural networks for face detection typically perform well when the entire face is visible. When these methods are applied to videos that pan across the interior of a room (as is common during property inspections), this creates a problem in that some faces are only partially visible in a frame. Standard neural networks are unable to consistently detect partial faces in frames, which will result in the faces not being blurred until they are completely visible in the frame. Partially visible faces may be identifiable, which may result in privacy issues. The disclosed technology provides a low-complexity solution to this problem.

Figure 7:
FIG. 7 illustrates an example of detectability in a video frame.

FIG. 7 illustrates an example of this problem, wherein the left and right image frames include only partial views of a face, which invariably results in no detection (or detection with very poor accuracy), whereas the center image frame includes a view of the entire face that can typically be consistently detected by a neural network.

Embodiments of the disclosed technology provide techniques to detect partial faces in video frames, which enables the blurring operation to be applied consistently across the property inspection video. The described embodiments leverage the fact that detection by a neural network is generally performed on a per-frame basis, and that the neural network attempts to identify a face in each frame of a video.

Instead of identifying faces on a per-frame basis in a strictly temporal manner (e.g., starting from the first frame, making a final decision therein, and continuing to the next frame), the described embodiments detect a face along a space-time path a face takes through the multiple frames of a video segment.

Figure 8A:
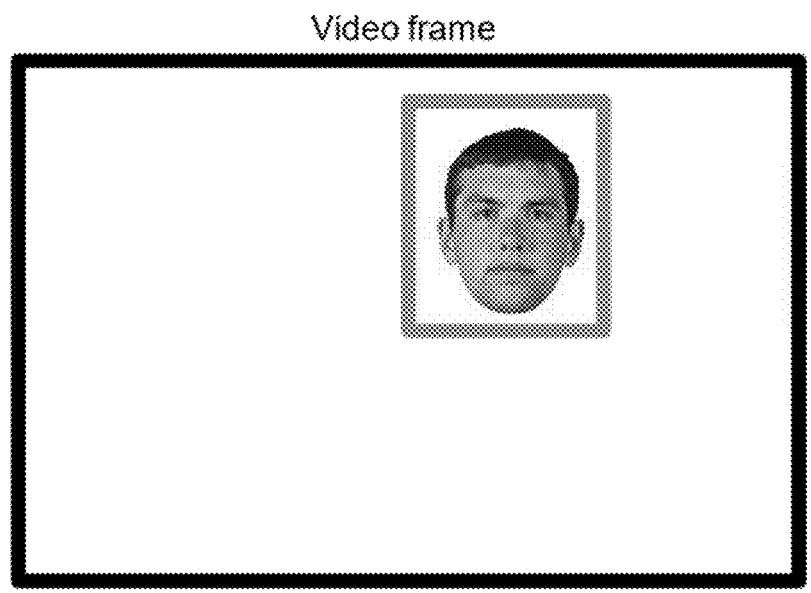
FIGS. 8A-8C illustrate the detection and tracking operations of an example face detection algorithm.
Figure 8B:
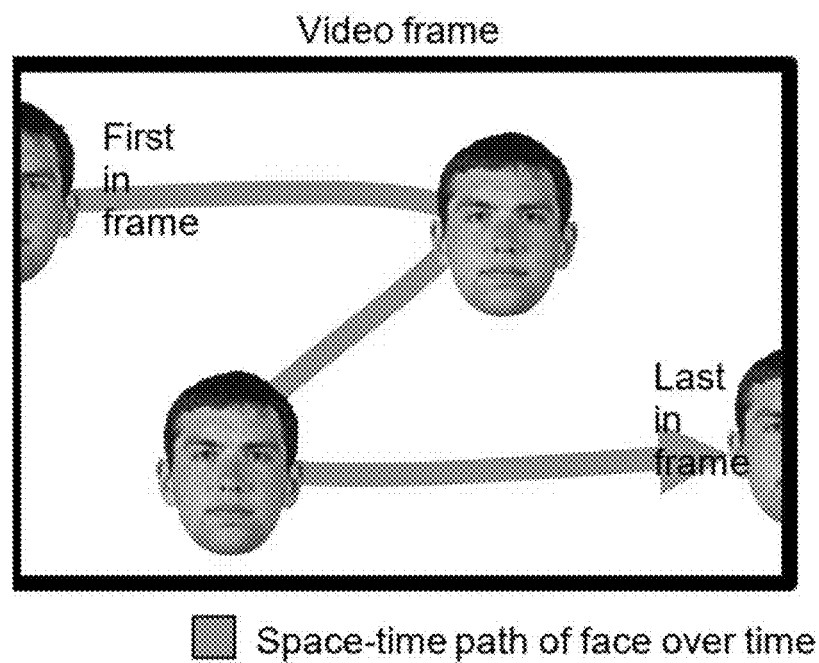
Figure 8C:
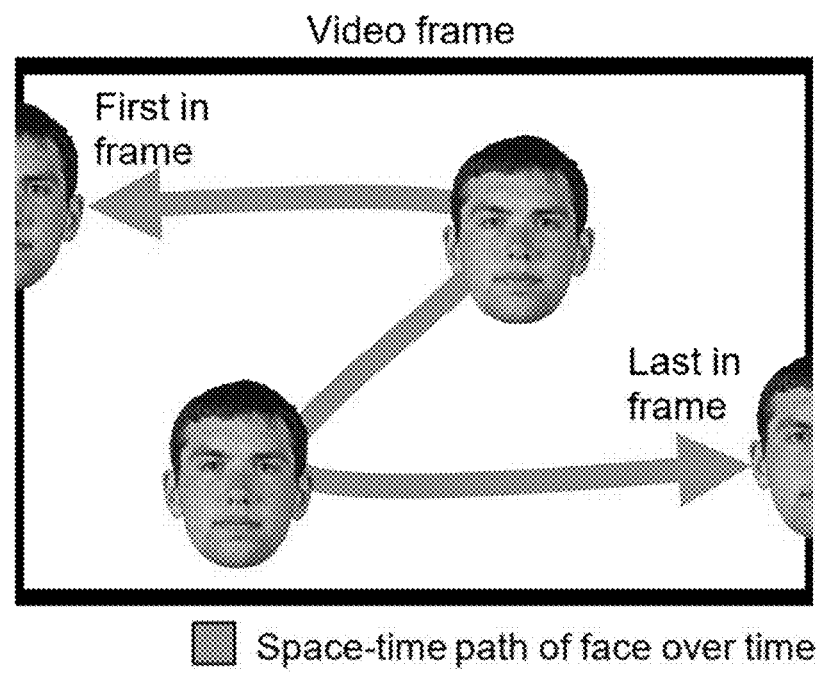

FIGS. 8A-8C illustrate the detection and tracking steps of an example face detection algorithm. As shown in FIG. 8A, the neural network detects a complete face in a video frame by superimposing a bounding box on the frame (e.g., similar to the example shown in FIG. 3). FIG. 8B shows an example of tracking the face as it enters the video frame (referred to as first-in-frame), traverses through the visible video frame region, and exits the video frame (referred to as last-in-frame). The space-time path of the face as it moves within the visible video frame is shown in FIG. 8B, and is determined as follows:

Step 1. The neural network is configured to detect faces in the video on a per-frame basis until a detection occurs, as shown in FIG. 8A, with a bounding box being superimposed on the face. In an example, the first detection of the full view of a face will occur in frame N, where N is a positive integer greater than 1, i.e., the first frame will typically not have a full view of the face.

In some embodiments, frame N is referred to as an anchor image, which is used to generate the space-time path as described in Step 2.

Step 2. When detection has occurred (e.g., at frame N), an optical region tracking algorithm is used to track the bounding box of the frame forward in time, from frame N to the last-in-frame position, and backward in time, from frame N to the first-in-frame position, as shown in FIG. 8C.

It is noted that the optical region tracking algorithm does not rely on face detection to operate, but relies on the pixel-wise, frame-to-frame similarity of the bounding box region being tracked. Thus, the optical region tracking algorithm is capable of tracking a face region, e.g., the bounding box, all the way to the edge of the frame and until the face is out of the frame. Specifically, the optical region tracking algorithm is configured to robustly determine when tracking is lost, i.e., the first-in-frame and last-in-frame positions are reached.

In some embodiments, the optical region tracking algorithm uses a Channel and Spatial Reliability Tracking (CSRT) algorithm that relies on discriminative correlation filters (DCF), which have been frequently used for short-term tracking with reliably high detection performance.

Figure 9:
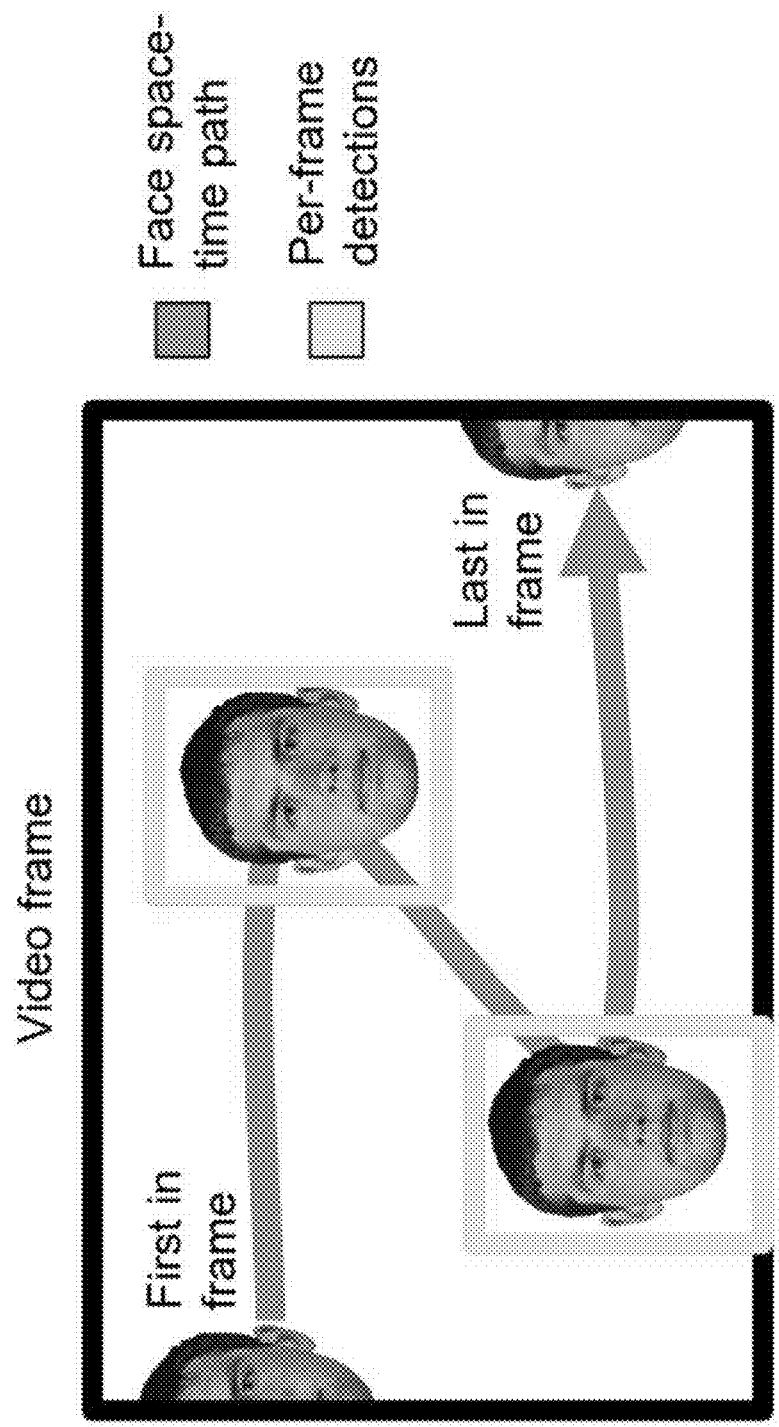
FIG. 9 illustrates an example of the methodology for the example face detection algorithm shown in FIGS. 8A and 8B.

Step 3. Having determined the space-time path of the face in the visible region of the video frame, the per-frame neural network detections of the bounding box that occur along the space-time path are examined, as shown in FIG. 9. As shown therein, the per-frame detections, which occur on the space-time path, are identified in video frames.

In some embodiments, the probability that the region tracked across the space-time path is actually a face is computed by combining scores for the detections that occur at locations that intersect the curve. That is, the probability of the bounding box following the space-time path across the video frames is determined and compared to a predetermined threshold. If the probability is greater than the predetermined threshold, it may be concluded that a face has been tracked along the space-time path over the video. In an example, the predetermined threshold is set by the user.

Computing the aforementioned probability has the effect of increasing the accuracy of the overall blurring process because no single frame is relied upon to determine the success or failure of the blurring. In contrast, the blurring is based on the joint information from all the per-frame detections along the space-time path corresponding to the tracked face.

Figure 10:
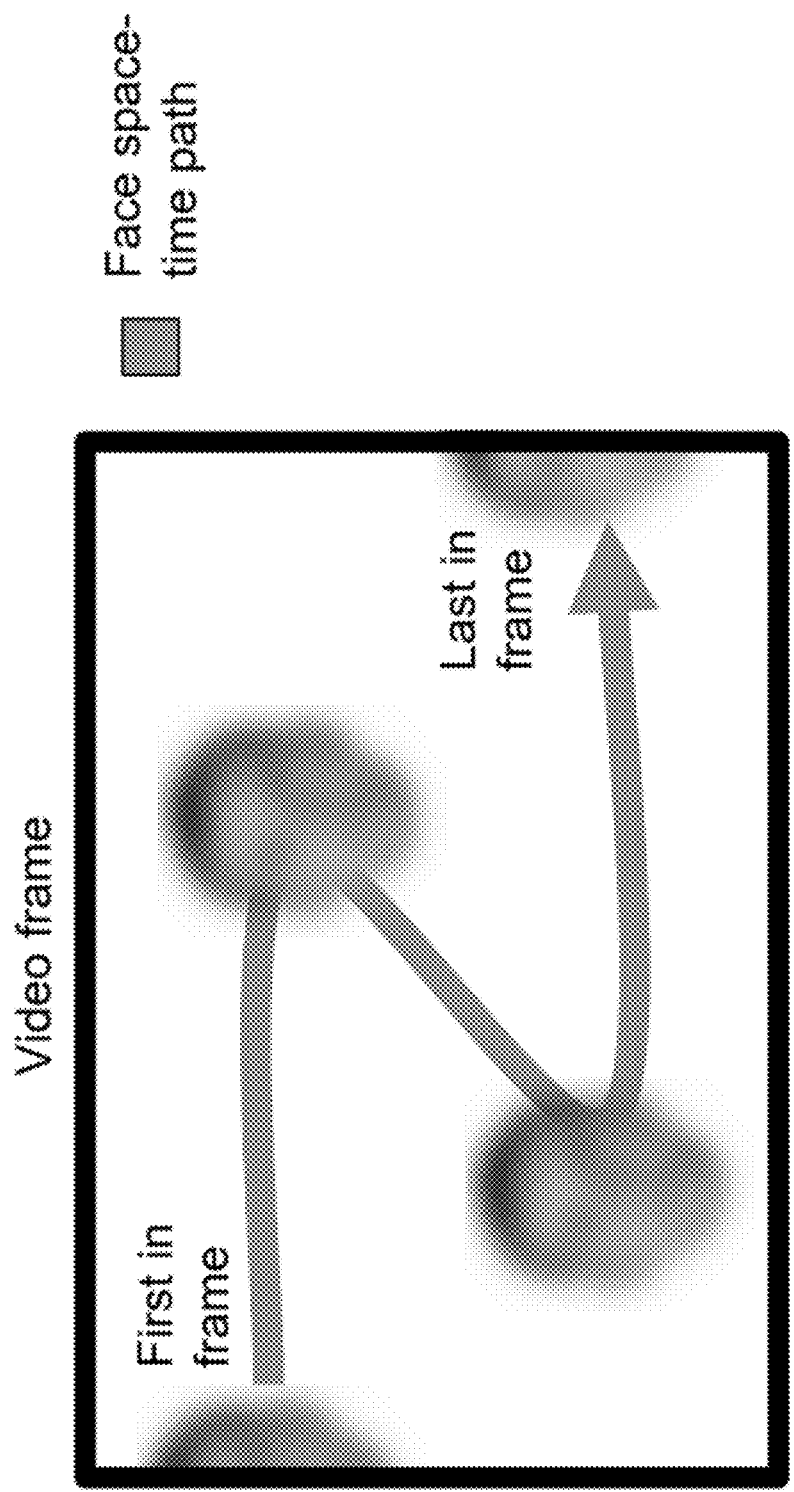
FIG. 10 illustrates the resulting blurred output for the FIG. 9 example.

Step 4. Finally, a blurring kernel is applied to the face in the bounding box region tracked along the space-time path between the first-in-frame and the last-in-frame positions, as shown in FIG. 10. In an example, the blurring kernel is a Gaussian blurring kernel, with a kernel size that is set to ½ the width of the bounding box.

In some embodiments, Steps 1-4 are configured to be implemented as part of the inference process, e.g., in the inference module 214 in FIG. 2.

Example Methods and Implementations

Embodiments of the disclosed technology provide methods, systems and devices to generate a training set to enable a neural network to accurately detect faces in images and video that have been captured in interior rooms and exterior environments that include surfaces with high reflectivity, and to blur the faces through the duration of a video segment, e.g., from a first-in-frame location to a last-in-frame location, as shown in FIGS. 8B, 8C, 9 and 10. These embodiments are further clarified in the methods described below, which may be implemented in at least one of the components illustrated in FIGS. 1, 2 and 12.

Although the embodiments have discussed detecting and blurring human faces, the described techniques are applicable to the detection and blurring of any identifying characteristics (e.g., hair, specific text on an article of clothing) of both human and animal subjects.

For example, the described embodiments could be used to blur out pets and other animals by replacing the face training dataset with a database that provided images of pets (e.g., the Oxford Pet Dataset). In this example, the background images (e.g., image 510 in FIG. 5) would include backyard and/or pet carrier images, in addition to interior rooms. This would enable the described algorithms to be trained to blur pets in inference images and videos.

FIGS. 11A and 11B illustrate flow diagrams of methods for generating a training data set and face detection and blurring, respectively.

FIG. 11A illustrates a flowchart of a method 1100 for generating a training data set. The method 1100 includes, at operation 1101, selecting a first image depicting an interior of a room.

The method 1100 includes, at operation 1102, selecting a second image depicting at least a face of a person.

The method 1100 includes, at operation 1103, generating, based on a transparency parameter and a roughness parameter, a semi-transparent surface image.

The method 1100 includes, at operation 1104, selecting an illumination parameter to configure a first illumination level for the first image and a second illumination level for the second image.

The method 1100 includes, at operation 1105, generating a first composite image of the training data set by combining the illumination parameter, the first image, the second image, and the semi-transparent surface image.

In some embodiments, the method 1100 further includes the operation of applying, based on the roughness parameter, a Gaussian blur kernel to the face of the person in the first composite image.

In some embodiments, the method 1100 further includes the operation of generating a plurality of composite images of the training data set by varying values of the transparency parameter, the roughness parameter, and the illumination parameter for the first image, the second image, and the semi-transparent surface image.

In some embodiments, the method 1100 further includes, part of generating the plurality of composite images, the operation of iterating over a range of values of a first parameter, and generating a subset of the plurality of composite images for each value in the range of values of the first parameter, a constant value for a second parameter, and a constant value for a third parameter.

In some embodiments, the first parameter is the transparency parameter, the second parameter is the roughness parameter, and the third parameter is the illumination parameter.

In some embodiments, the first parameter is the roughness parameter, the second parameter is the transparency parameter, and the third parameter is the illumination parameter.

In some embodiments, the first parameter is the illumination parameter, the second parameter is the roughness parameter, and the third parameter is the transparency parameter.

In some embodiments, the method 1100 further includes the operation of training, based on the training data set, a deep neural network, and using the deep neural network to blur at least one face in an inference image of the interior of the room.

FIG. 11B illustrates a flowchart of a method 1150 for face detection and blurring. The method 1150 includes, at operation 1151, receiving a plurality of images that captures a person traversing an interior of a room.

The method 1150 includes, at operation 1152, processing, using a face detection algorithm, the plurality of images to identify an anchor image comprising a complete view of a face of the person and generating a bounding box for the face of the person.

The method 1150 includes, at operation 1153, processing, using an optical region tracking algorithm, the plurality of images to identify a trajectory of the bounding box across the plurality of images.

The method 1150 includes, at operation 1154, applying a blurring kernel over the bounding box across each of the plurality of images.

In some embodiments, the trajectory comprises a backward-in-time trajectory that tracks the bounding box from the anchor image to a first image of the plurality of images and a forward-in-time trajectory that tracks the bounding box from the anchor image to a last image of the plurality of images, and at least the first image or the last image comprises a partial view of the face of the person and a partial bounding box.

In some embodiments, the blurring kernel is a Gaussian blurring kernel.

In some embodiments, the optical region tracking algorithm comprises a channel and spatial reliability tracking (CSRT) algorithm.

In some embodiments, the face detection algorithm uses a neural network.

In some embodiments, the first image is a first-in-frame image comprising the partial view of the face of the person, and the last image is a last-in-frame image comprising the partial view of the face of the person.

In some embodiments, the optical region tracking algorithm refrains from using the face detection algorithm.

Figure 12:
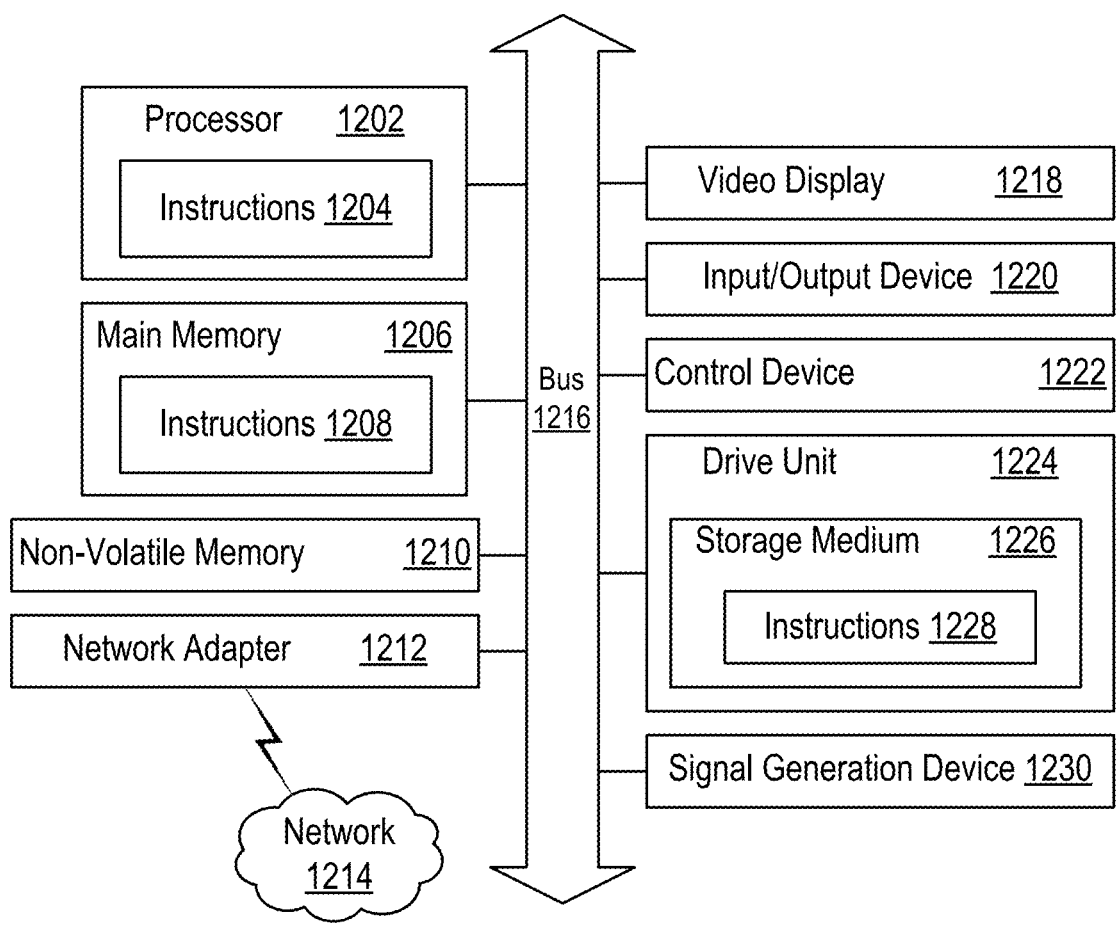
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on a computing device that includes an inspection platform.

The processing system 1200 may include one or more central processing units ("processors") 1202, main memory 1206, non-volatile memory 1210, network adapter 1212, video display 1218, input/output devices 1220, control device 1222 (e.g., a keyboard or pointing device), drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 1206, non-volatile memory 1210, and storage medium 1226 are shown to be a single medium, the terms "machine-readable medium" and "storage medium" should be taken to include a single medium or multiple media (e.g., a centralized/distributed database and/or associated caches and servers) that store one or more sets of instructions 1228. The terms "machine-readable medium" and "storage medium" shall also be taken to include any medium that is capable of storing, encoding, or carrying a set of instructions for execution by the processing system 1200.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computing device. When read and executed by the processors 1202, the instruction(s)

cause the processing system 1200 to perform operations to execute elements involving the various aspects of the present disclosure.

Further examples of machine- and computer-readable media include recordable-type media, such as volatile and non-volatile memory devices 1210, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of face detection and blurring, comprising:
receiving a plurality of images that captures a person traversing an interior of a room;
processing, using a face detection algorithm, the plurality of images to identify an anchor image comprising a complete view of a face of the person and generating a bounding box for the face of the person;
processing, using an optical region tracking algorithm, the plurality of images to identify a trajectory of the bounding box across the plurality of images;
applying a blurring kernel over the bounding box across each of the plurality of images;
determining a subset of images of the plurality of images, wherein a position of the bounding box is on the trajectory in each of the subset of images; and
computing, based on the subset of images, a probability corresponding to the bounding box following the trajectory, wherein applying the blurring kernel is based on a comparison of the probability to a threshold,
wherein the trajectory comprises a backward-in-time trajectory that tracks the bounding box from the anchor image to a first image of the plurality of images and a forward-in-time trajectory that tracks the bounding box from the anchor image to a last image of the plurality of images,
wherein the optical region tracking algorithm refrains from using the face detection algorithm,
wherein the trajectory tracks the bounding box based on a pixel-wise, frame-to-frame similarity of a region associated with the bounding box, and
wherein at least the first image or the last image comprises a partial view of the face of the person and a partial bounding box.

2. The method of claim 1, wherein the blurring kernel is a Gaussian blurring kernel.

3. The method of claim 1, wherein the optical region tracking algorithm comprises a channel and spatial reliability tracking (CSRT) algorithm.

4. The method of claim 1, wherein the face detection algorithm uses a neural network.

5. The method of claim 4, wherein the first image is a first-in-frame image comprising the partial view of the face of the person, and wherein the last image is a last-in-frame image comprising the partial view of the face of the person.

6. The method of claim 1, wherein a kernel size of the blurring kernel is equal to 0.5×W, and wherein W is a width of the bounding box.

7. The method of claim 1, wherein the threshold is a user-configured predetermined threshold.

* * * * *